Figure 1:
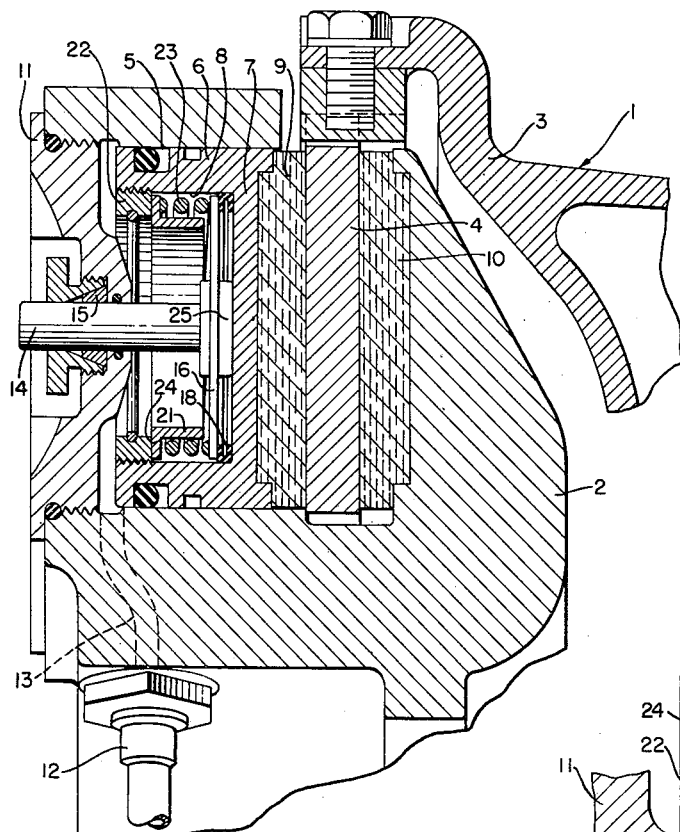

April 30, 1957   J. G. HAWLEY   2,790,515
BRAKE HAVING DEFLECTION COMPENSATION MEANS THEREIN
Filed Sept. 2, 1955

INVENTOR.
JESSE G. HAWLEY
BY
R. L. Miller
ATTORNEY

United States Patent Office 2,790,515
Patented Apr. 30, 1957

2,790,515

BRAKE HAVING DEFLECTION COMPENSATION MEANS THEREIN

Jesse G. Hawley, Penn Yan, N. Y., assignor to The Goodyear Tire & Rubber Company, Akron, Ohio, a corporation of Ohio Application September 2, 1955, Serial No. 532,275

8 Claims. (Cl. 188—72)

This invention relates to brakes, especially to brakes for use with brake discs and relatively lightweight housings wherein such brakes have deflection compensation means therein to insure desirable brake operation and complete brake release at proper times.

In the production of various types of brakes, and especially those used on aircraft wheels, the brakes in many instances include one or more rotating discs to which braking forces are applied by brake block means provided at localized circumferential portions of the rotating discs. The braking means are held in position by sturdy but relatively lightweight housings even though relatively large braking forces are applied to the rotating discs for braking action thereon. In the application of these relatively large braking forces to brakes of this type, the supporting housings and flanges are usually positioned on opposite sides of the rotating discs so that when braking forces are applied to the housings, they have considerable forces set up therein urging them to pull apart, and to rotate around their support means so that such brake mechanism positioning means, flanges and/or housings may spring apart appreciably upon brake action. It is also noted that in many instances brake discs do not remain flat after appreciable periods of use but frequently assume a wavy and/or conical shape. When brake forces are applied to a conically-shaped brake disc, for example, before any braking action is effectively secured upon both sides of the brake disc, it must be flattened and, of course, appreciable forces are required to flatten this member before desirable braking conditions are established.

Brakes of the type referred to frequently have an automatic adjustment or wear piston such as shown in U. S. Patent No. 2,392,970 associated therewith for limiting the position of the operative brake lining means in the brake and limiting the return clearance set up in the brake when the brake is not positively actuated. While these previous types of automatic adjustment pins or pistons have worked effectively for controlling movement of the brake lining means towards operative positioning with the brake disc, it has been established that the adjustment pins may have heretofore in some instances limited the return or clearance position of the brake block means in the brake to retain a "drag" thereon even though the brake is completely released.

A general object of the present invention is to avoid and overcome the foregoing and other objections to and difficulties with brakes of the types referred to and to provide a new and improved type of a brake having a deflection compensation means provided therein.

A further object of the invention is to provide a seal member between an automatic adjustment piston in a brake and the outer brake piston in which the adjustment piston is slidably received so that drag or return forces applied to the outer brake piston due to the prior springing of the brake housing and flattening of the brake disc are transmitted to the inner adjustment piston when the brake is released.

Another object of the invention is to provide a relatively simple but automatically functioning U-shaped in section seal in a brake of the type referred to, wherein such seal becomes operative only for a short period of time immediately following brake actuation for applying any drag or deflection forces upon the brake when inoperative to the adjustment piston of the brake assembly.

The foregoing and other objects and advantages of the invention will be made more apparent as the specification proceeds.

Figure 3:
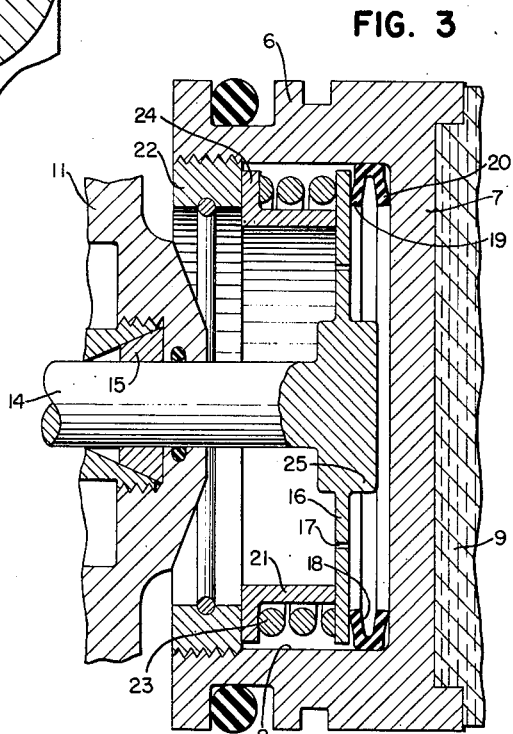
Figure 2:
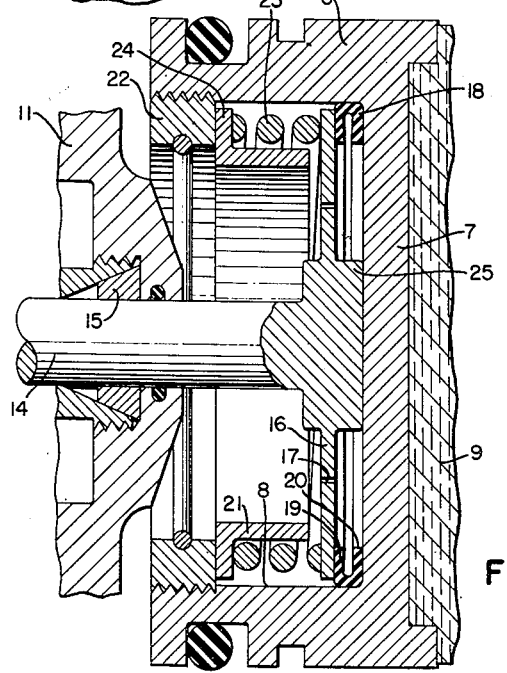

In order to understand the invention more completely reference should be had to the accompanying drawings, wherein:

Fig. 1 is a fragmentary vertical section through a brake of the invention and embodying the principles thereof;

Fig. 2 is an enlarged fragmentary section of the control means for the brake of Fig. 1, which brake is shown in its inoperative or off-position, as fluid pressure is started to be supplied thereto; and Fig. 3 is a vertical section similar to Fig. 2 with the brake in its operative position and with the seal means of the invention being operative, the brake being shown in its position immediately after relase of braking pressure.

When referring to corresponding parts in the drawing and specification, corresponding numerals will be used to facilitate comparison between these similar parts.

The present invention in general relates to a brake comprising a hollow piston having one open end and a closed end for effecting braking action when moved in one direction, an adjusting pin having restrained axial movement in the brake parallel to the axis of the piston, a head or enlarged means on the adjusting pin positioned in the piston and slightly smaller in outer diameter than the bore of the piston, means for limiting the amount of relative movement between the piston and adjusting pin upon braking action, hydraulic means for effecting braking movement of the piston by contacting the piston and its bore, and a U-shaped in section sealing ring lying between the closed end of the piston and the adjusting pin head, the base portion of the sealing ring being adjacent the bore of the piston with opposed arms lying against the closed end of the piston and the head for sealing action therewith.

Attention now is directed to the accompanying drawings and to the details shown therein so that the present invention can be completely and clearly understood. The drawings show a brake indicated as a whole by the numeral 1, which brake is shown as including a brake housing 2 shown in association with a wheel 3. The wheel 3 has a brake disc 4 in conventional splined engagement therewith, which brake disc 4 extends into a portion of the housing 2 for braking action to be exerted thereon by brake means, hereinafter described, carried by and positioned in the brake housing 2. Preferably these brake application means are of the "spot" type located at one or more circumferential portions of the brake disc 4 and with the brake housing 2 having a hydraulic chamber or cylinder 5 provided therein in which a piston 6 is positioned. This piston 6 preferably has a closed or head end 7 and is provided with an open end exposing a bore 8 of the piston.

Any suitable brake block or lining means 9 is conventionally engaged with the closed end 7 of the piston 6 for effecting braking action on the brake disc 4 when moved up into engagement therewith. A similar brake block 10 is positioned in fixed engagement with a portion of the brake housnig 2 on the opposite side of the brake disc 4 from the brake block 9 for braking action on the adjacent side of the brake disc 4 when forced over into contact with the block 10.

The sealed hydraulic fluid receiving chamber or cylinder 5 is provided in the brake housing 2 by a suitable closure disc 11 engaged with the brake housing. A conventional fitting 12 on the housing 2 connects to a bore 13 extending to the cylinder 5 for supply of a hydraulic fluid thereto under pressure for actuation of the piston 6 for brake action.

An adjusting pin 14 extends through a friction disc 15 secured to and carried by the closure disc 11 for frictionally grasping the adjusting pin 14 and normally preventing any axial movement thereof until at least a predetermined force is applied thereto for moving such pin axially. It will be seen that the adjustment pin 14 is positioned for movement parallel to and along the axis of the piston 6. The adjusting pin 14 has some suitable type of an enlarged portion or head 16 provided thereon or suitably secured thereto, which head is positioned within the piston 6 adjacent the closed end 7 thereof and with the head 16 being of a diameter slightly smaller than the bore diameter of the piston.

It will be noted that, as a feature of the invention to be described hereinafter in more detail, a small hole 17 is provided in the head 16 and connects the face thereof positioned adjacent the closed end of the piston 6 to the remaining space in the bore of the piston on the opposite face of the head 16. A particularly important element of the present invention resides in a sealing ring 18 positioned intermediate the head 16 of the adjusting pin and the closed end 7 of the hollow centered piston 6. Such sealing ring 18 preferably is of U-shape in section and is made from any conventional flexible, resilient material, such as rubber or rubber-like substances, used for making sealing rings, gaskets, or similar members. It will be seen that this sealing ring 18 has two opposed arms 19 and 20 extending from a base area thereof and that the base portion of the ring 18 is positioned adjacent to and lying parallel with the bore of the piston 6. The drawings show how in inoperative position, the sealing ring 18 has the arms 19 and 20 thereof lying adjacent to the head 16, and closed end 7 of the piston, respectively. However, as hydraulic fluid is forced into the cylinder 5 through the conventional supply means provided therefor, such hydraulic fluid will flow around past the arm 19 of the sealing ring 18, as indicated in Fig. 2, and the entire piston 6 will be moved toward the brake disc 4 for effecting braking action thereon.

A conventional positioning or limiting sleeve 21 is carried by the piston 6 to engage the head 16, to permit only limited relative movement between the piston 6 and the adjusting pin 14 on brake actuation. This sleeve 21 is suitably based on or against the piston 6, as by a base ring 22 engaging the piston. The sleeve 21 is held against the ring 22 by a spring 23 compressed between the head 16 and a flange 24 on the sleeve 21.

Thus, on initial actuation of the brake 1, the piston 6 will move forwardly to attempt to urge the brake block 9 into engagement with the brake disc 4. Should there be any initial positioning of this brake disc 4 out of a plane, obviously the first forces applied to such brake disc by the brake block 9 will primarily move such brake disc 4 into a planar position. Also, there may be some axial movement effected on the brake disc 4 to push it over towards the brake block 10. Hence, the movement required for the piston 6 to effect braking action may be sufficient as to bring the spacing sleeve 21 into contact with the adjustment pin head 16 so that the braking force applied will be transmitted to the adjustment pin 14 and may move such pin axially through the friction means 15 in producing braking action.

Fig. 2 best shows that the hydraulic fluid, when initially forced into the piston 6, will flow around the sealing ring 18 and how a portion of the head 16 will be abutted against the closed end 7 of the piston in the inoperative position of the brake. However, upon moving into operative braking position, Fig. 3, the piston 6 has been moved relative to the adjusting pin 14 so that the head 16 is spaced from the adjacent closed end of the piston.

As an important feature of the invention, the sealing ring 18 automatically and immediately springs into operative position when no further actuating force is applied to the means supplying hydraulic fluid through the fitting 12 to the brake 1. At such time, the hydraulic fluid entrapped between the head 16 of the adjusting pin and the closed end 7 of the piston will expand the sealing ring 18 into the operative position shown in Fig. 3 to make the adjusting pin 14, head 16, and piston 6 a unit, insofar as external return forces applied to the piston are concerned. Thus, return forces applied to the piston 6, such as by the brake disc 4 again moving to a slightly conical or non-planar shape, are transmitted to the adjusting pin 14 for moving it axially in the friction means 15 or other retaining means provided therefor. The pressure set up on the head 16 by the entrapped hydraulic fluid will slowly be relieved by passage of hydraulic fluid through the bleed hole 17 provided in the head 16 of the adjustment pin so that ultimately the piston 6 will be free for movement independently of the adjusting pin 14. Then the spring 23 will return the piston 6 to provide normally spaced, inoperative position of the sleeve 21 with relation to the head 16 of the adjusting pin, as indicated in Fig. 2.

The head 16 of the adjustment pin 14 has a boss 25 on the surface thereof and it prevents undesirable compression of the sealing ring 18. Such action is secured by the closed end 7 of the piston bearing against the boss 25 and preventing further movement of the adjustment pin 14 into the piston 6.

From the foregoing, it will be seen that the brake of the invention provides a novel temporary seal for transmitting return forces applied to brake means by either the housing 2, and/or the brake disc 4 over to the adjustment pin 14 provided in the brake assembly. However, such a seal is only of a temporary nature and permits the brake block carrying piston 6 to be moved in a short length of time to its normal inoperative, spaced position with relation to the brake disc of the brake assembly so that an effective, improved functioning brake has been provided by the invention and the objects thereof have been achieved.

Other modifications of the invention may be resorted to without departing from the spirit thereof or the scope of the appended claims.

I claim:

1. In a brake, a hollow centered piston having an open end and a closed end for effecting braking action when moved in one direction, an adjusting pin having restrained axial movement in the brake parallel to the axis of said piston, a head on said adjusting pin received in said piston and being slightly smaller in outer diameter than the bore of said piston, means for limiting the amount of relative movement between said piston and said adjusting pin when braking movement of said piston occurs, hydraulic means for effecting braking action of said piston by contact with said piston and the bore thereof, a U-shape in section sealing ring lying between the closed end of said piston and said head, the base portion of said sealing ring being adjacent the bore of said piston and one of the opposed arms of said sealing ring contacting the closed end of said piston and the other arm contacting said head for sealing action therewith and a bleed hole through said head of the adjusting pin for ultimately freeing said piston for movement independent of said head.

2. In a brake, a hollow centered piston having an open end and a closed end for effecting braking action when moved in one direction, an adjusting pin having restrained axial movement in the brake, a head on said adjusting pin received in said piston and being slightly smaller in outer diameter than the diameter of the bore of said piston, sleeve and spring means for limiting the amount of relative movement between said piston and said adjusting pin when braking and release movement of said piston occur, hydraulic means for effecting braking movement of said piston by contact with said piston and the bore thereof, a sealing ring having axially spaced sealing arms thereon lying between the closed end of said piston and said head, for sealing action therebetween when the brake is released and a bleed hole through said head of the adjusting pin for ultimately freeing said piston for movement independent of said head.

3. In a brake, a cylinder, a hollow piston slidably positioned in said cylinder, brake block means on said piston, an adjustment pin, means for retarding axial movement of said pin, head means secured to said pin and extending into said piston, a positioning sleeve received within said piston and retained against movement therefrom axially away from said head means by a shoulder of said piston, spring means based against said head means for urging said piston and brake block means to inoperative position, means for supplying hydraulic pressure to said piston and head means to move said piston axially in one direction for brake action, a U-shape in section sealing ring between said head means and said piston to form a seal therebetween when the actuation of the hydraulic pressure supply means is terminated and a bleed hole through said head means for ultimately freeing said piston for movement independent of said head means, said sealing ring having its base contacting the bore of said piston and its legs contacting said head means and the head of said piston.

4. In combination in a brake, a brake disc, a brake housing, a cylinder in said housing, a hollow piston slidably positioned in said cylinder, brake block means on said piston for contact with said brake disc, an adjustment pin, means for retarding axial movement of said pin, head means on said pin and extending into said piston, spring means based against said head means for urging said piston and brake block means to inoperative position, means for supplying hydraulic pressure within said piston and against said head means to move said piston for brake action, a U-shape in section, flexible sealing ring between said head means and said piston to form a seal therebetween when the actuation of the hydraulic pressure supply means is terminated, said sealing ring being of U-shaped cross-section and having two opposed annular sealing lips, one of which lies against said head means and the other against the head of said piston with the base of the sealing ring against the bore of the piston, and a bleed hole through said head means for ultimately freeing said piston for movement independent of said head means.

5. In a brake, a cylinder, a piston having an end recess therein slidably positioned in said cylinder, brake block means on said piston, an adjustment pin, means for retarding axial movement of said pin, head means on said pin and extending into the recess in said piston, a positioning sleeve received within the recess in said piston and retained against movement therefrom, spring means based against said head means for urging said piston and brake block means to inoperative position, means for supplying hydraulic pressure to said piston and head means to move said piston for brake action, and a U-shape in section flexible sealing ring between said head means and the adjacent portion of said piston to form a sealed chamber therewith when the actuation of the hydraulic pressure supply means is terminated, said sealing ring having its base contacting the bore of said piston and its legs contacting the head of said piston and said head means, said head means having a small hole therethrough to bleed fluid from said sealed chamber.

6. In a brake, a piston having a recess therein, brake lining means on said piston, an adjustment pin and head unit slidably received in the recess in said piston, spring means compressed between said adjustment pin and head unit and said piston to provide operating clearance when said piston is not actuated, hydraulic means for moving said piston to operative position, and freely positioned U-shape in section plastic means having its base contacting the bore of said piston recess and its legs contacting the head of said head unit and said piston respectively to provide a seal therebetween when said piston is operatively positioned, whereby return forces applied to said piston for actuation thereof are transmitted to said adjustment pin, said plastic means permitting hydraulic fluid to flow thereby into the space between said head unit and said piston and a small bleed hole through said head means for ultimately freeing said piston for movement independent of said adjustment pin and head unit.

7. In a brake, a hollow centered piston having an open end and a closed end for effecting braking action when moved in one direction, an adjusting pin having restrained axial movement in the brake and having a portion received in said piston and only slightly smaller in outer diameter than the bore of said piston, hydraulic means for effecting braking action of said piston by contact with said piston and the bore thereof, and a U-shape in section sealing ring lying between the closed end of said piston and said portion of said adjusting pin, the base portion of said sealing ring being adjacent the bore of said piston and opposed arms of said sealing ring contacting the closed end of said piston and said portion of said adjusting pin for sealing action therewith, said portion of said adjusting pin having a bleed hole therein to slowly release fluid trapped by said sealing ring.

8. In a brake, a hollow centered piston having an open end and a closed end for effecting braking action when moved in one direction, an adjusting pin having restrained axial movement in the brake and having a portion received in said piston and only slightly smaller in outer diameter than the bore of said piston, hydraulic means for effecting braking action of said piston by contact with said piston and the bore thereof, and a U-shape in section sealing ring lying between the closed end of said piston and said portion of said adjusting pin, the base portion of said sealing ring being adjacent the bore of said piston and opposed arms of said sealing ring contacting the closed end of said piston and said portion of said adjusting pin for sealing action therewith, said portion of said adjusting pin having a boss thereon to bear against the closed end of said piston and prevent excessive compression of said sealing ring by movement of said adjusting pin into said piston and said portion of said adjusting pin having a bleed hole therethrough for ultimately releasing said piston, and said portion from one another.

No references cited.